United States Patent [19]

Stock

[11] 3,992,981
[45] Nov. 23, 1976

[54] WEB STRIPPING APPARATUS
[75] Inventor: David K. Stock, Green Bay, Wis.
[73] Assignee: FMC Corporation, San Jose, Calif.
[22] Filed: Nov. 19, 1975
[21] Appl. No.: 633,528

[52] U.S. Cl. .............................. 93/33 H; 93/DIG. 1;
 156/515
[51] Int. Cl.² ........................ B31B 1/16; B31B 1/64
[58] Field of Search ............ 93/33 H, 33 R, DIG. 1,
 93/8 R; 156/515, 583, 251; 83/171; 225/101;
 53/DIG. 2

[56] References Cited
UNITED STATES PATENTS

| | | | |
|---|---|---|---|
| 2,882,956 | 4/1959 | Weist | 53/379 X |
| 3,133,684 | 5/1964 | Wiltshire et al. | 225/101 |
| 3,384,528 | 5/1968 | Lehmacher et al. | 93/33 H |
| 3,640,790 | 2/1972 | Rowley et al. | 156/515 X |
| 3,813,998 | 6/1974 | Lotto | 93/33 H |
| 3,884,129 | 5/1975 | Monahan | 93/33 H X |
| 3,895,751 | 7/1975 | Shepherd | 225/101 X |

Primary Examiner—James F. Coan
Attorney, Agent, or Firm—C. E. Tripp; A. J. Moore

[57] ABSTRACT

A web of thermosealing material is intermittently advanced by draw rolls between cooperating sealing and severing heads with the downstream end of the web being advanced onto a pick-off conveyor assembly before being stopped. While the web is stationary, one of the sealing heads is moved into pressure engagement with the other head, with the web disposed therebetween, to clamp, sever and seal the web. The web is transversely severed downstream of the seal and after the severing and sealing operation is completed said one head is moved transversely away from the web; and the other hand is momentarily moved downstream relative to the stationary web for stripping the web from said other head prior to the next cycle of operation of the draw rolls.

13 Claims, 2 Drawing Figures

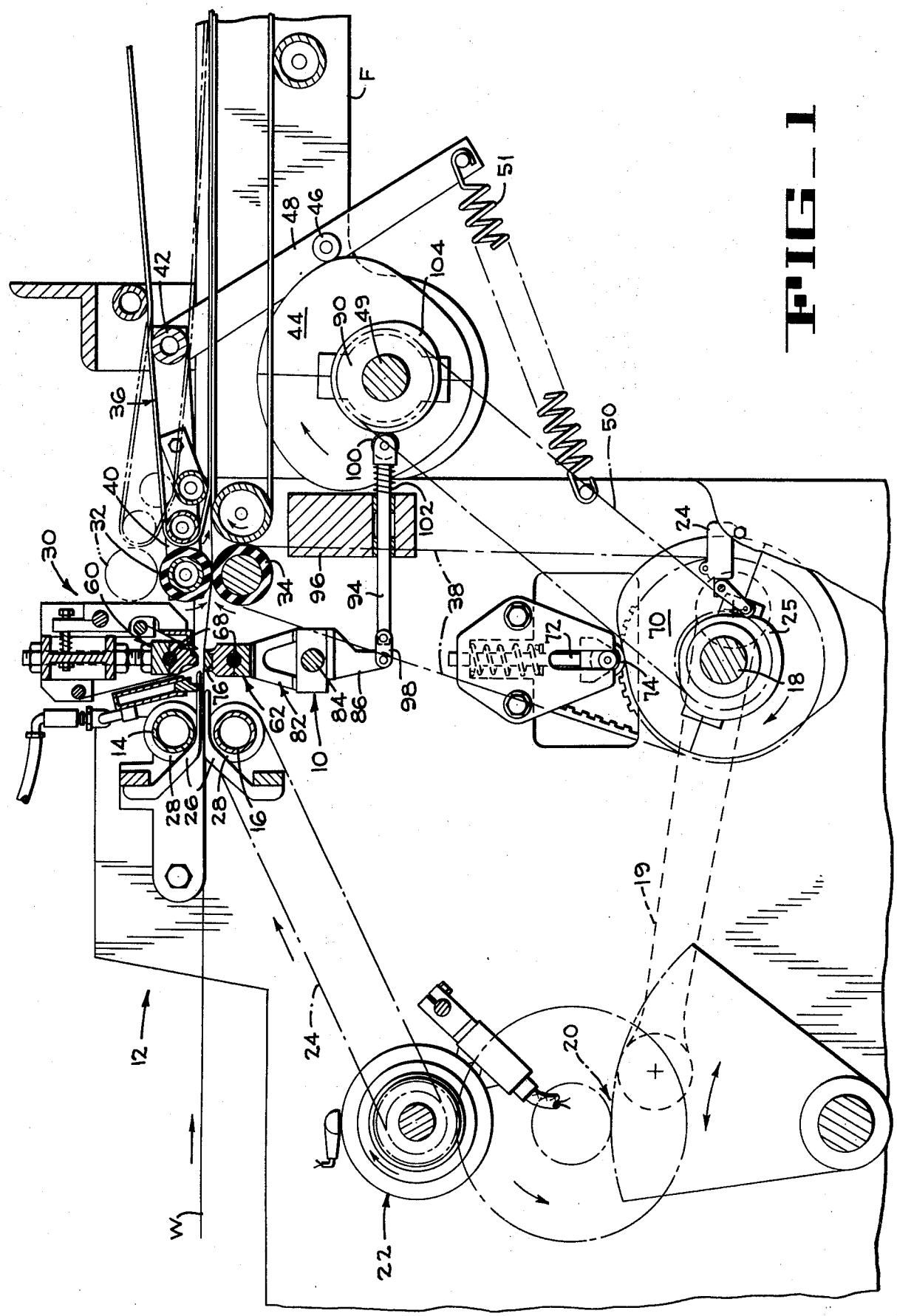
FIG_1

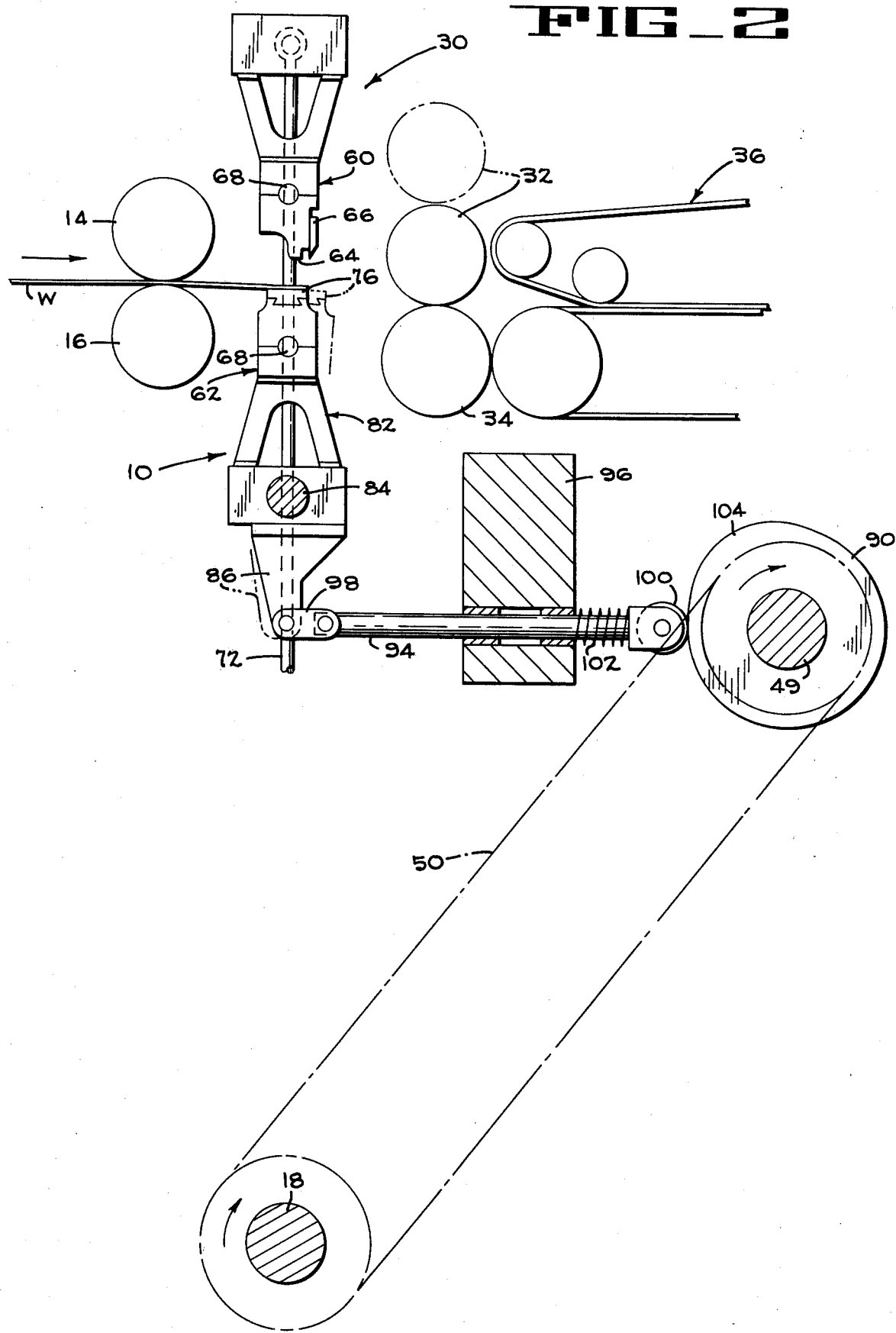

WEB STRIPPING APPARATUS

CROSS REFERENCE TO RELATED APPLICATIONS

This application relates to the type of bag machines described in U.S. Lotto application Ser. No. 382,607 and Stock et al. application Ser. No. 612,059 which are assigned to the assignee of the present invention.

BACKGROUND OF THE INVENTION

1. Field of the Invention

This invention pertains to the bag making art and more particularly relates to an apparatus for stripping the web from the sealing heads of a bag machine or the like.

2. Description of Prior Art

In the thermosealing or thermoplastic bag making industry, bag producers frequently desire to make bags from tubular stock with their closed ends first or downstream relative to the direction of movement of the web. These bags are known as bottom weld, closed end first bags. Since the thermosealing operation melts or partially melts the bag material, there is a tendency for the hot material at the forward end of the web to adhere to one or both of the sealing heads. Thus, steps must be taken to strip the web from both seal bars or heads since the web is usually quite thin and, if adhered to one of the heads, cannot be pushed, as opposed to being pulled, through the sealing and severing station by the intermittent web advancing draw rolls.

U.S. Pat. No. 3,813,998 which issued to Ronald L. Lotto on June 4, 1974 and is assigned to the assignee of the present invention discloses one way of stripping film from the seal bars. In the Lotto machine, as well as in the subject bag machine, the drive means for the draw rolls includes a portion which oscillates thereby driving the draw rolls from about zero velocity through a maximum velocity and back to about zero velocity during each forward or draw stroke of the draw rolls. In order to strip the web in the Lotto bag machine, the drive to the draw rolls is clutched in early so that the draw rolls will rotate at a very slow speed in a reverse direction about 10° thereby gently pulling the web rearwardly to positively strip it from the weld bars prior to driving the rolls forwardly to gradually accelerate and thereafter decelerate the web while advancing the web one bag length through the sealing and severing station.

U.S. Pat. No. 2,882,956 which issued to Weist on Nov. 9, 1956 likewise discloses a bag machine which pulls the web free from a seal bar in a reverse direction but does not gradually accelerate and decelerate the web.

SUMMARY OF THE INVENTION

The web stripping apparatus of the present invention is intended for use in a bag machine of the type disclosed in the aforementioned Lotto U.S. Pat. No. 3,813,998 but without driving the draw rolls in a reverse direction. The draw rolls advance the web in bag length intervals through the sealing and severing station and into pick-off conveyor means with the leading edge of the web being sealed. When the draw rolls are stationary, one of the sealing and severing heads, which heads are spaced apart during web advancement, is moved into sealing engagement with the web to heat seal the leading edge of the web and sever the web downstream of the seal area prior to returning to the spaced condition. In order to strip the web from the other sealing head, the other head is momentarily moved downstream while the web is clamped in fixed position between the draw rolls. The lower sealing head is returned to its sealing position prior to the next bag cycle.

In accordance with the present invention a web stripping apparatus for a bag machine includes intermittently driven draw rolls for cyclically advancing a web of thermosealing material along a path through a sealing station; the improvement being a first sealing means disposed at the sealing station on one side of said path and having a sealing surface, a second sealing means disposed at the sealing station on the other side of said path and having a sealing surface, means for heating at least one of said sealing means to a bonding temperature, means for moving one of said sealing means in a direction substantially normal to said path between a position spaced from said path and a position in sealing engagement with the web, severing means on one side of said web movable into the web when the web is stationary for transversely severing the web, and means for momentarily moving the sealing surface of the other sealing means to substantially parallel to said path when the web is stationary to strip the web from the sealing surface of said other sealing head.

BRIEF DESCRIPTION OF THE DRAWING

FIG. 1 is a vertical longitudinal section of a portion of a bag machine incorporating the web stripping apparatus of the present invention, the sealing heads being shown approaching their sealing positions just as the web terminates its forward movement.

FIG. 2 is an enlarged diagrammatic side elevation illustrating the operation of the web stripping apparatus showing the parts in solid lines in their sealing position and showing the lower head in dotted lines in its web stripping position both of which occur just prior to engaging the clutch and disengaging the brake that controls the drive to the draw rolls.

DESCRIPTION OF PREFERRED EMBODIMENT

The web stripping apparatus 10 (FIGS. 1 and 2) of the present invention is incorporated in a bag machine 12 of the general type disclosed in Wech U.S. Pat. No. 3,663,338 which issued on May 16, 1972; and the previously mentioned Lotto U.S. Pat. No. 3,813,998. Both of these patents are assigned to the assignee of the present invention and are incorporated by reference herein particularly for the showing of the drive mechanism for the bag machine. Because of the similarity of the Wech and Lotto bag machines with the subject bag machine, only the new web stripping apparatus and its operation will be described in detail.

In general, the bag machine 12 includes an upper draw roll 14 and a lower draw roll 16 which frictionally engage a web W which is preferably tubular, of thermoplastic or thermosealing material. The lower draw roll 16 is driven from a main drive shaft 18 which is rotated one revolution for each bag cycle. The drive shaft 18 drives the lower draw roll 16 through a crank arm 19, an oscillating gear segment and pinion drive assembly 20, a clutch brake assembly 22 and a chain drive 24. The clutch-brake assembly 22 is timed relative to the oscillating gear segment drive 20 and main drive shaft 18 to engage the clutch and release the brake when the gear segment is at the left end of its stroke, and to disengage the clutch and engage the brake when the gear segment is at the other end of its stroke illustrated in FIG. 1. Thus, the draw rolls 14 and 16 commence advancing the web at zero velocity and gradually increase to a maximum velocity and then return to zero velocity when advancing the web one bag length or 180° of rotation of the main drive shaft 18. During the other 180° of rotation of the main drive shaft 18, the brake is engaged and the clutch is disengaged to clamp the leading portion of the web in fixed position. The clutch and brake of the clutch-brake assembly 22 are controlled by a switch 24 operated by a cam 25 secured to the main drive shaft 18.

Transverse series of upper and lower web guiding fingers 26 are disposed in spaced annular grooves 28 in the draw rolls and aid in guiding the web into a sealing and severing station 30.

Pick-off rolls 32 and 34 of a pick off assembly 36 are disposed downstream of the sealing and severing station 30. The lower pick-off roll 34 is driven from the main drive shaft 18 by a chain or lug belt drive 38 while the upper roll 32 is journaled on the end of levers 40 connected to a pivot shaft 42 journaled on the frame F of the machine. The upper pick-off roll 32 is moved into and out of clamping engagement with the web downstream of the station 30 by a cam 44 which engages a cam follower 46 on a lever arm 48 secured to the pivot shaft 42. The cam 44 is keyed to a shaft 49 and is driven from the main drive shaft 18 by a chain or lug belt drive 50 one revolution for each revolution of the main drive shaft 18.

A spring 51 and the periphery of the cam 44 cooperate to raise the upper pick-off roller 32 when the web is being advanced thereby permitting the leading end of the web to move between the pick-off rollers. After the web has completed its movement the upper pick-off roll is cammed downwardly into clamping engagement with the web to apply tension to that portion of the web between the draw rolls 14,16 and the pick-off rolls 32,34 and maintains this tension during severance of the web. If the web is completely severed (as opposed to being perforated) to provide a bag, the bag is thereafter advanced by the pick-off rolls and other components of the pick-off assembly into any suitable takeaway or stacking device.

The above components of the bag machine are substantially the same as that disclosed in the aforementioned Lotto and Wech patents and accordingly if a more detailed explanation of the components is desired, reference may be had to these patents.

The web stripping apparatus 10 of the present invention includes an upper sealing head 60 and a lower sealing head 62. The upper head 60 is the same as that disclosed in the Lotto patent and includes a sealing surface 64 (FIG. 2) disposed upstream of a hot knife 66 clamped thereto. The sealing surface 64 and the hot knife are electrically heated to a sealing and severing temperature by electrical heating elements 68 in a manner well known in the art. The upper head is reciprocated vertically into and out of sealing engagement with the web W once for each revolution of the main drive shaft 18 by a pair of cams 70 (FIG. 1) secured to the shaft 18, and cooperating push rods 72 (only a fragment of one rod being shown) having cam followers 74 on their lower ends and having their upper ends operatively connected to the upper head 60 all as more fully described in the aforementioned Wech patent.

The lower head 62 comprises a seal bar or pad 76 (FIG. 2) having a sealing surface which is electrically heated to the desired sealing temperature by heating elements 68. The pad 76 is supported on a rockable body 82 that is pivotally connected to the frame F of the machine 12 by pivot shaft 84. As illustrated in FIG. 2, the seal pad 76 is disposed above pivot shaft 84 and a lever 86 is connected to and projects downwardly from the shaft 84. The sealing surfaces of both the upper and lower heads are preferably metal surfaces covered with Teflon impregnated glass cloth.

A lower head rocking cam 90 is secured to the shaft 49 which is journaled in the frame F and is driven one revolution for each revolution of the main drive shaft 18 by the aforementioned chain drive 50. A push rod 94 is slidably received in a member 96 of the frame F and is connected to the lower end of the lever 86 by a pivot linkage 98. A cam follower 100 is journaled on the other end of a push rod 94 and is urged against the periphery of the cam 90 by a spring 102. The major portion of the periphery of the cam 90 is shaped to retain the lower head 62 in sealing position illustrated in solid lines in FIG. 2, while a lobe 104 on the cam 90 is effective to rock the lower head to the dotted line position to gently strip the sealed end of the web W from the lower sealing head 62 prior to the start of a new bag advancing cycle and thereafter return the lower sealing head to its solid line sealing position.

It will be noted that during the stripping operation the lower head is rocked in the direction of advancement of the forward end of web W while the web is clamped in fixed position by the draw rolls 14 and 16. Although there is an arcuate component of motion to the sealing surface of the lower head, the sealing surface is moved substantially parallel to the path of movement of the web. It will also be noted that the surface of the cam lobe 104 provides a gradual, rather than abrupt, movement of the lower head during stripping thus minimizing danger of harming the hot seal area.

In operation, the main drive shaft 18 is continuously driven and the clutch-brake assembly 22 is activated by the switch 24 and cam 25. As illustrated in FIG. 1, a bag length of the web has just completed its movement into sealing position and is ready to be sealed and severed. After sealing and severing, the upper sealing head 60 then moves upwardly to the position illustrated in FIG. 2 during which time the upper fingers 26 (FIG. 1) resist upward movement of the web and strip the web from the upper sealing head in the event it should tend to adhere to the upper head.

After the upper head 60 is separated from the lower head 62, the cam lobe 104 of the cam 90 causes the lower head 62 to momentarily rock to the dotted line position while the web is still clamped between the stationary draw rolls 14,16 thereby stripping the web W from the lower sealing head 62. The lower head 62 is then returned to the solid line position and the clutch of the clutch-brake assembly 22 is engaged to move the web W one bag length downstream to initiate another bag cycle.

As is well known in the art, strips of Teflon (polytetrafluoroethylene) impregnated glass cloth are disposed over both sealing heads to reduce the tendency of the web to stick to the heads.

Although the web stripping apparatus has been described in conjunction with making closed end first bags from a tubular web, it will be understood that the apparatus may also be used with other types of webs to make other types of articles.

From the foregoing description it is apparent that the web stripping apparatus of the present invention assures that a heated web is stripped from the upper vertically reciprocable sealing head by providing stripper fingers which resist upward movement of the web with the head. The web is stripped from the lower sealing head by momentarily moving the lower head downstream when the web is being held from movement by the draw rolls.

Although the best mode contemplated for carrying out the present invention has been herein shown and described it will be apparent that modification and variation may be made without departing from what is regarded to be the subject matter of the invention.

I claim:

1. A web stripping apparatus for a bag machine including intermittently driven draw rolls for cyclically advancing a web of thermosealing material along a path through a sealing station, the improvement which comprises a first sealing means disposed at the sealing station on one side of said path and having a sealing surface, a second sealing means disposed at the sealing station on the other side of said path and having a sealing surface, means for heating at least one of said sealing means to a bonding temperature, means for moving one of said sealing means in a direction substantially normal to said path between a position spaced from said path and a position in sealing engagement with the web, severing means on one side of said web movable into the web when the web is stationary for transversely severing the web, and means for momentarily moving the sealing surface of the other sealing means substantially parallel to said path when the web is stationary to strip the web from the sealing surface of said other sealing head.

2. An apparatus according to claim 1 wherein said means for momentarily moving said other sealing means imparts a rocking motion to said other sealing means.

3. An apparatus according to claim 1 wherein said means for momentarily moving said sealing surface of said other sealing means moves the sealing surface downstream of the web when the web is stationary.

4. An apparatus according to claim 1 wherein said severing means completely severs the web to cut an article therefrom.

5. A web stripping apparatus for a bag machine including intermittently driven draw rolls for cyclically advancing bag lengths of a web of thermosealing material along a path between stripper fingers disposed on opposite sides of the path, through a sealing station, and into a bag pick-off assembly; the improvement which comprises a first sealing head disposed at the sealing station on one side of said path and having a sealing surface, a second sealing head disposed at the sealing station on the other side of said path and having a sealing surface, means for heating at least one of said heads to a bonding temperature, means for moving one of said heads in a direction substantially normal to said path between a position spaced from said path and a position in sealing engagement with the web, severing means on one side of said web and downstream of said sealing surfaces movable into the web when the web is stationary for transversely severing the web, and means for momentarily moving the other head downstream of the web to strip the web from the sealing surface of said other sealing head.

6. An apparatus according to claim 5 wherein said other head is pivotally mounted to the bag machine and wherein said momentary moving means rocks said other head downstream and then back to its sealing position to strip the web therefrom.

7. An apparatus according to claim 6 wherein said momentary moving means includes a cam for rocking said other head.

8. An apparatus according to claim 6 wherein said severing means completely severs the web to cut a bag therefrom.

9. An apparatus according to claim 7 wherein said one head is disposed above said web, said moving means being effective to reciprocate said one head into and out of engagement with the web, and the stripper fingers which are disposed closely adjacent said one head for stripping the web from said one head upon upward movement thereof.

10. An apparatus according to claim 5 wherein said severing means is movable into said web to at least partially sever the web.

11. An apparatus according to claim 10 wherein said severing means completely severs the web to cut a bag therefrom.

12. An apparatus according to claim 11 wherein said severing means is a hot knife connected to said one head for movement therewith, said hot knife being moved through the web prior to sealing, and when the web is stationary and is being tensioned between the stationary draw rolls and the pick off assembly.

13. An apparatus according to claim 12 wherein both heads are heated to a bonding temperature.

* * * * *